F. V. ELBERTZ.
DIFFERENTIAL AXLE MECHANISM.
APPLICATION FILED MAY 28, 1918.
1,354,475.
Patented Oct. 5, 1920.
3 SHEETS—SHEET 3.
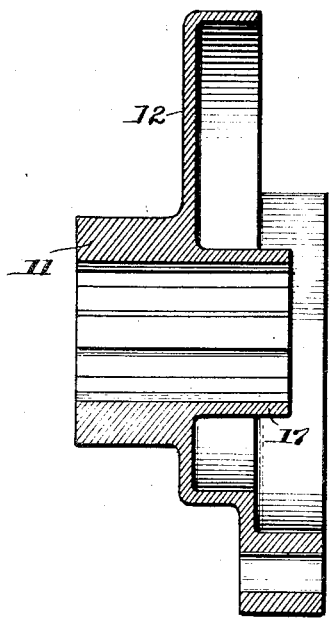
Fig. 4.
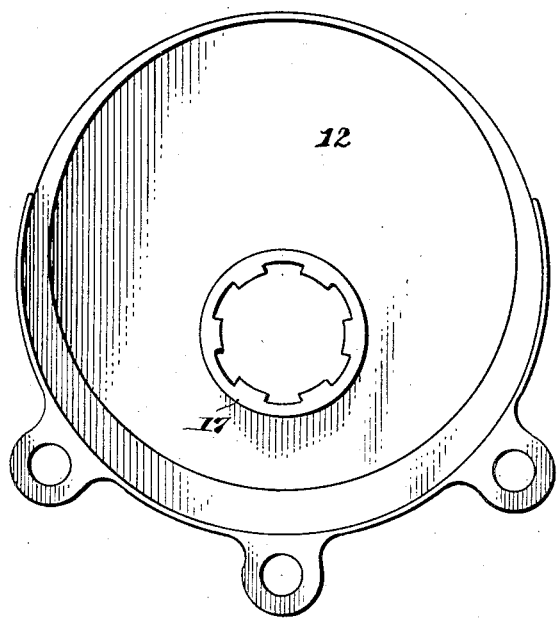
Fig. 3.
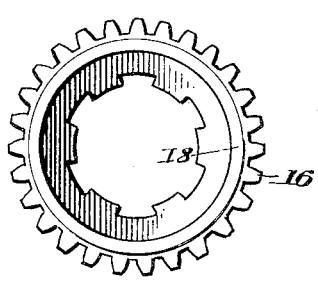
Fig. 5.
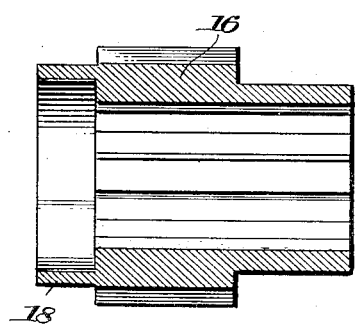
Fig. 6.
Inventor
Frank V. Elbertz,
By 
Attorney

UNITED STATES PATENT OFFICE.

FRANK V. ELBERTZ, OF DETROIT, MICHIGAN, ASSIGNOR TO B. F. EVERITT COMPANY, OF DETROIT, MICHIGAN, A CORPORATION OF MICHIGAN.

DIFFERENTIAL AXLE MECHANISM.

1,354,475.　　　　　　Specification of Letters Patent.　　　Patented Oct. 5, 1920.

Application filed May 28, 1918. Serial No. 237,144.

*To all whom it may concern:*

Be it known that I, FRANK V. ELBERTZ, a citizen of the United States of America, residing at Detroit, in the county of Wayne and State of Michigan, have invented certain new and useful Improvements in Differential Axle Mechanism, of which the following is a specification, reference being had therein to the accompanying drawings.

This invention relates to a differential mechanism adapted for a rear axle or traction axle drive, and to an arrangement thereof whereby a positive action is insured at all times, the proper variations of speed obtained, and a minimum of parts employed without the use of beveled or planetary gears.

The invention consists in the matters hereinafter set forth, and more particularly pointed out in the appended claims.

In the drawings,

Fig. 3 is a view in end elevation of an eccentric connection for one of the differential shafts;

Fig. 4 is a view in cross section thereof; and

Figs. 5 and 6 are views in detail of a differential shaft follower pinion.

Figure 1:
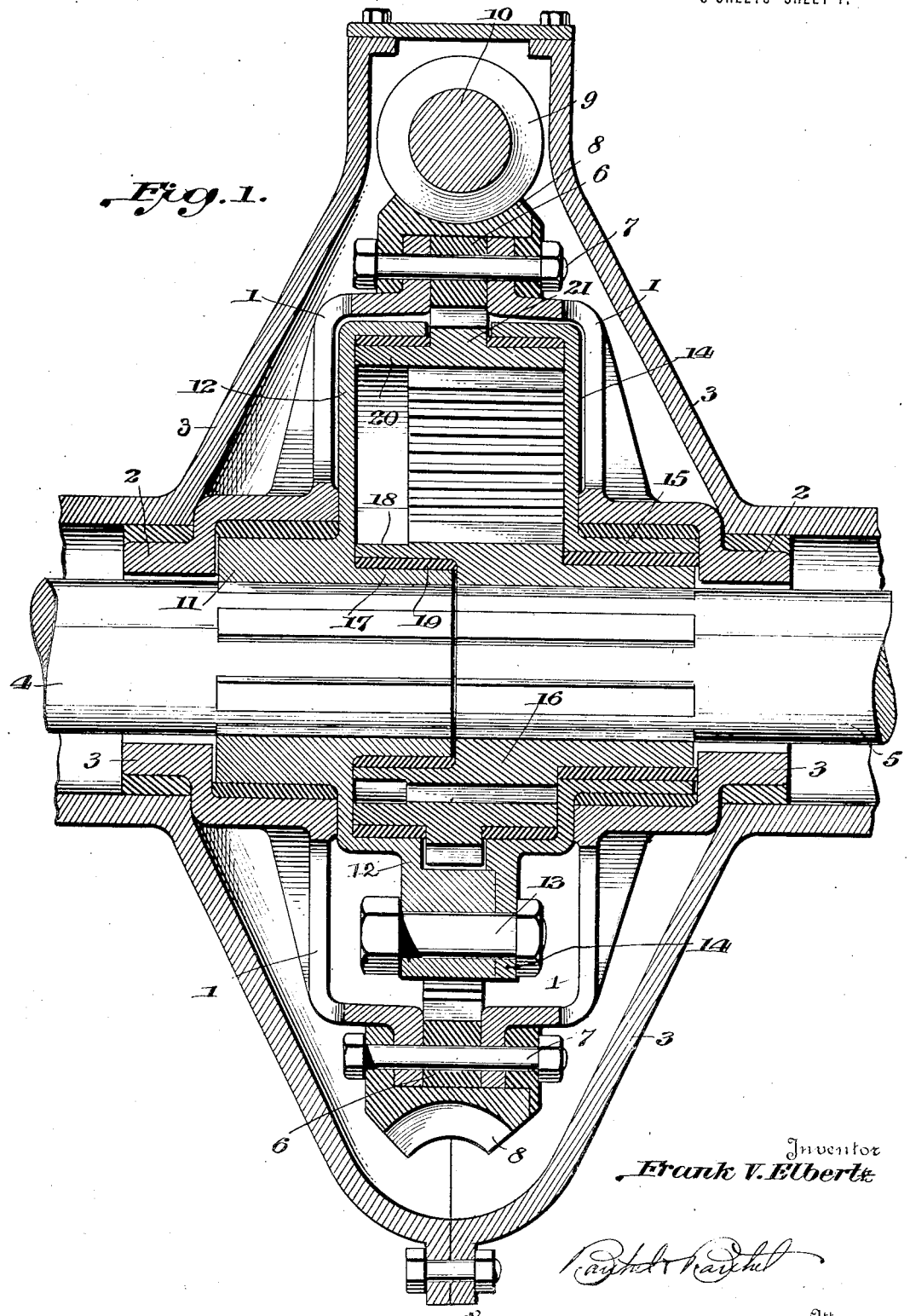
Figure 1 is a view in longitudinal section of a mechanism embodying features of the invention, mounted in a driving axle.
Figure 2:
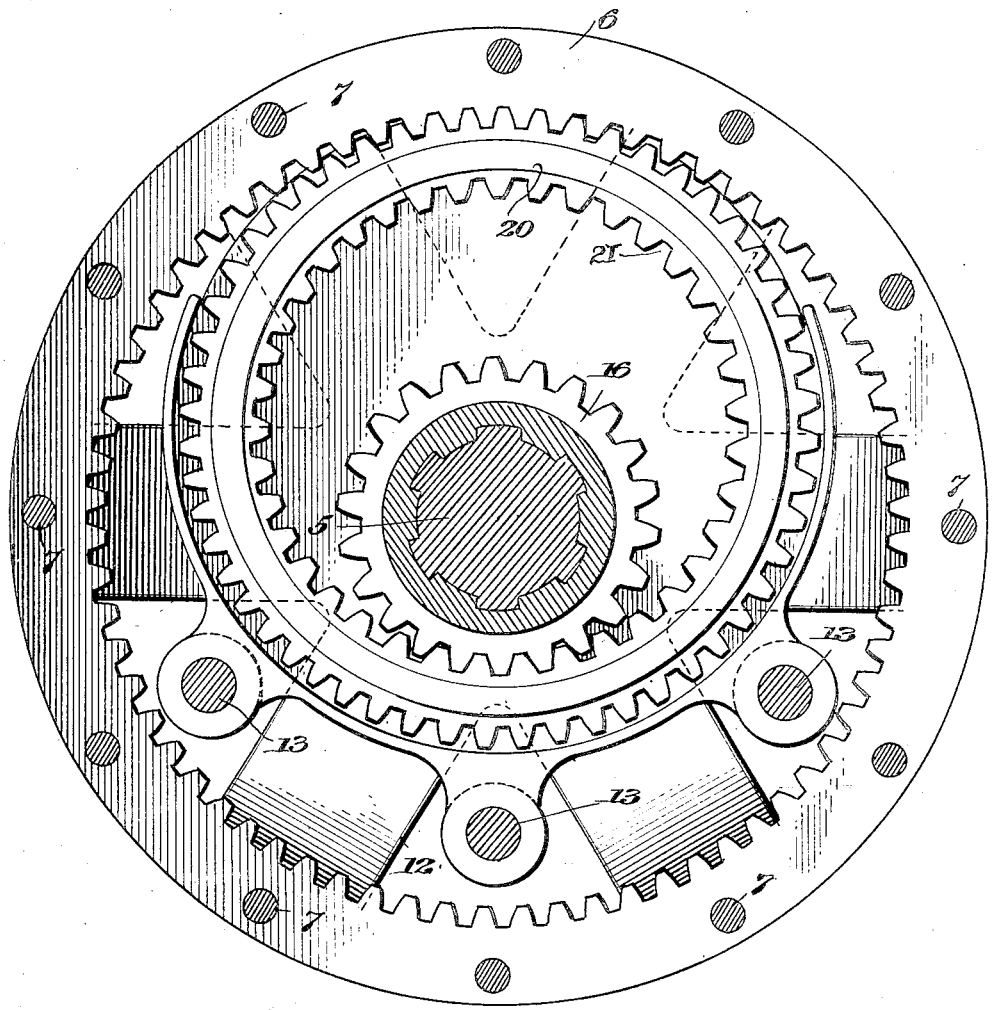
Fig. 2 is a view in cross section thereof.

As herein shown in preferred form, a casing formed of a pair of oppositely disposed spiders 1 suitably designed to combine strength and lightness, is journaled by the hubs 2 thereof in the housing 3 of a rear drive shaft having differential shaft sections 4 and 5. An internal gear 6 is clamped between the spiders as by suitable holding studs 7 or other preferred means concentrically with the hub axes. Any form of power transmitting means may be applied to the spiders, as for example a worm wheel 8 driven by a worm 9 from the propeller shaft 10.

One of the sections, as 4, is keyed or otherwise non-rotatably secured to the hub 11 of a section 12 which is secured as by bolts 13 or the like to an opposed companion section 14, the hub 15 of which is likewise journaled in the companion spider.

The shaft section 5 is otherwise non-rotatably secured to the hub of a pinion 16 which in turn is rotatable in the hub of the section 14 concentrically with the shafts, the main casing and the housing. To aid in preserving the alinement, the hub 11 may have an inner extension 17 on which a complementary extension 18 of the hub of the pinion 16 is journaled, there being an interposed bushing 19 as indicated. Bushings, as shown, are provided between the other parts.

The united sections 12 and 14 have a bearing recess eccentric to the shafts 4 and 5 in which the hub 20 of a compound gear 21 is journaled. The eccentricity of this recess is sufficient to maintain the gear 21 outwardly in mesh with the internal gear 6 and internally, with the shaft pinion 16.

When power is applied from the propeller shaft through the gear casing and the annular gear 6, and the shaft sections 4 and 5 are free to turn at equal speeds, the rotation of the driving gear 6 tends to turn the double intermediate or compound gear 21 on its own axis, but the rotation is resisted by the teeth of the intermediate gear meshing with the teeth of the shaft pinion 16. Consequently the intermediate gear swings eccentrically around the axis of the shaft sections 4 and 5 and carries with it the eccentric bearing member composed of the sections 12 and 14 in which it is journaled. Thus both shafts 4 and 5 turn in unison with the spiders, or the casing composed of the spiders.

If the shaft 4 to which the eccentric bearing members are non-rotatably secured, can speed up ahead of the driving speed imparted to it by the internal gear 6, through the casing or spiders, then it tends to swing the eccentric bearing members ahead and thereby to relieve the driving strain on the teeth of the pinion 16 from the internal teeth of the compound intermediate gear and permits the rotation of the latter in the concentric bearing so that the shaft 4 can travel as fast as it desires.

If the shaft 5 can overrun the driving speed given it through its connection with the casing, then the pinion 16 on such shaft increases the stress upon the internal teeth of the intermediate gear in opposite direction to that stress imparted to such teeth of the pinion 16 by the regular driving strain, that is, it reverses the thrust against these teeth and permits the pinion to rotate as fast as it desires, turning the intermediate gear 21 on its own axis in the eccentric bearing members, regardless of the revolutions of these members around the shaft axis.

Because of the arrangement of the parts, not only is straight gearing employed, but the bearing is so distributed throughout the mechanism that there is no tendency to side thrust or to weaving, while the minimum number of parts greatly decreases the friction. there being no beveled gears or planetary gears such as are commonly used. The construction is extremely rigid and because of the number of teeth that can be readily engaged, permits the transmission of great power. Furthermore the driving force is distributed exactly to the two shaft sections in proportion to the load imposed upon each.

Obviously, changes in the details of construction may be made without departing from the spirit of my invention and I do not care to limit myself to any particular form or arrangement of parts.

What I claim is:—

1. In a differential mechanism, a driving casing carrying an internal gear, a bearing member journaled concentrically to the gear in the casing, a follower member non-rotatably secured to the bearing member concentrically therewith, a follower member journaled concentrically in the bearing member, a pinion secured to the latter follower member, and an intermediate compound gear rotatable in the bearing member, meshing with both the pinion and the internal gear.

2. In a drive shaft construction, a housing, a driving casing journaled in the housing, an internal gear secured concentrically in the driving casing, a bearing member journaled concentrically to the gear in the casing, a follower member non-rotatably secured to the bearing member concentrically therewith, a follower journaled concentrically in the bearing member, a pinion secured to the latter follower member, and an intermediate compound gear rotatable in the bearing member meshing with both the pinion and the internal gear.

3. In a differential mechanism, a driving casing carrying an internal gear, a bearing member journaled concentrically to the gear in the casing and provided with an eccentric bearing recess, a follower member non-rotatably secured to the bearing member, a follower member journaled concentrically in the bearing member, a pinion secured to the latter follower member, and an intermediate compound gear journaled in the eccentric recess of the bearing member in mesh with the pinion and internal gear.

4. In a drive axle construction, a housing, a propeller shaft extending into the housing, a driving casing journaled in the housing and operated by the propeller shaft, an internal gear secured concentrically in the casing, a bearing member journaled concentrically to the gear in the casing, a follower member non-rotatably secured to the bearing member concentrically therewith, a follower member journaled concentrically in the bearing member, a pinion secured to the latter follower member, and an intermediate compound gear journaled in the bearing member eccentrically to the follower members in mesh with the pinion and internal gear.

5. In a differential mechanism, a driving casing, an internal gear secured concentrically in the casing, a bearing member journaled at both ends concentrically to the gear in the casing, and provided intermediate its ends with an eccentric bearing recess, a follower member non-rotatably secured to one end portion of the bearing member concentrically therewith, a follower member journaled concentrically in the other end portion of the bearing member, a pinion secured to the latter member in the bearing member, and an intermediate compound gear rotable in the eccentric bearing recess in mesh with both the pinion and internal gear.

6. In a driving axle, an exterior housing, a driving casing journaled at each end in the housing, a propeller shaft extending into the housing to which the casing is operatively connected, an internal gear secured concentrically in the casing, a bearing member journaled near each end concentrically to the gear and in the casing, and provided intermediate its ends with an eccentric bearing recess, a follower shaft rotatable in the housing non-rotatably secured to one end portion of the bearing concentrically therewith, a follower shaft rotatable in the housing journaled concentrically in the other end portion of the bearing, a pinion secured to the latter follower member within the bearing member, and an intermediate compound gear journaled in the eccentric bearing recess of the bearing member and in mesh with both the pinion and the internal gear.

7. In a driving axle, an exterior housing, a driving casing formed of opposed sections, each journaled at the outer end in the housing, an internal gear secured between and to the sections concentrically with the axis of the casing, a bearing member journaled at both ends in the casing concentrically to the gear and provided intermediate its ends with an eccentric bearing recess, a follower shaft rotatable in the housing non-rotatably secured to one end portion of the bearing member concentrically therewith, a follower shaft journaled concentrically in the other end portion of the bearing member, a pinion secured to the latter and in the bearing member, and an intermediate compound gear journaled in the eccentric bearing recess of the bearing member and in mesh with both the pinion and the internal gear.

In testimony whereof I affix my signature in the presence of two witnesses.

FRANK V. ELBERTZ.

Witnesses:
C. R. STICKNEY,
ANNA M. DORR.